Patented Oct. 1, 1929

1,729,707

UNITED STATES PATENT OFFICE

CHARLES H. CAMPBELL, OF PITTSBURGH, PENNSYLVANIA, ASSIGNOR TO AMERICAN GLUE COMPANY, OF BOSTON, MASSACHUSETTS, A CORPORATION OF MASSACHUSETTS

RECLAIMED RUBBER

No Drawing. Continuation of application Serial No. 124,107, filed July 21, 1926. This application filed November 22, 1928. Serial No. 321,280.

The invention relates to an improvement in reclaimed rubber, being the product obtained from rubber that has once been vulcanized and afterward devulcanized.

The present application is a continuation of my prior co-pending application Serial No. 124,107 filed July 21, 1926.

The general object of the invention is to obtain an improved reclaimed rubber which before revulcanization possesses highly efficient workable properties without the use of oil or with a quantity of oil much smaller than is ordinarily employed, and which reclaimed rubber after revulcanization gives a resulting rubber much firmer in character, tougher, with finer texture and of a higher tensile strength than that obtained from ordinary reclaimed rubber, especially where oil is used as a softening or plasticizing agent.

In the art of reclaiming rubber it is essential that, in addition to taking care of any free sulphur that may be present in the mass and possibly a small portion of the combined sulphur, the rubber scrap be softened or plasticized to a point that will render it possible for the manufacturer to afterwards mix in various pigments or a percentage of crude rubber, or both pigments and rubber. In order to do this it is essential that the reclaim possess certain characteristics. In the first place it must be plastic enough to work readily and stand a relatively high degree of heat without softening to a point that renders it difficult to mill on a warm mill. Ordinarily the manufacturer adds a large quantity of oil of various types to the various grades of reclaim in order to soften or plasticize them sufficiently for working purposes. The addition of a plasticizing oil however has its disadvantages. In the first place the rubber worker has found in practice that as soon as a reclaim carrying a high percentage of oil comes in contact with a heated mill it becomes so softened that it will not readily mill and will at times become so soft that it sticks to the mill. This is aggravated by the fact that in those rubbers having a high carbon black content, as in the case of the modern tire tread, the oil content is increased in order to effect the necessary plasticizing action. A further disadvantage which results from the use of oil as a plasticizing agent is that the oil will have a softening effect on the rubber after it is revulcanized, when in contact with heated surfaces such as pavements or roadways. In the case of rubber tires or rubber heels this causes a material reduction in the load carrying property of the rubber, resulting in excessive distortion and wear.

It is accordingly within the object of my invention as first pointed out to obviate these difficulties arising from the use of oil as a softening or plasticizing agent.

I have found that the objects of my invention are attained if the reclaimed rubber has incorporated with it cleavage products resulting from the hydrolytic decomposition of keratin and which incorporation is brought about by adding keratin to the rubber to be reclaimed, and then subjecting both rubber and keratin with it to the devulcanizing process if the process of devulcanization be one embodying hydrolysis, of which the alkali and heater processes of devulcanization are examples. In both of these processes the scrap material to be reclaimed is placed in heaters or digesters and subjected to a hydrolyzing action. In other words, the effect is to obtain reclaimed rubber resulting from the action of the hydrolyzed decomposition products of keratin upon the rubber scrap during the process of devulcanization.

As an example of the process now practiced keratin preferably either finely divided in its natural state, or previously hydrolyzed, and in liquid or dry form, is intimately mixed with the shredded scrap in the digester. If the reclaiming process is the customary alkali reclaiming process then keratin in its natural state may be added to the mass. In case however the heater process be employed for devulcanization then hydrolyzed keratin either in dry or liquid form should be used. The relative amount of keratin added to the rubber scrap will vary somewhat, dependent upon the results desired to be obtained. In practice preferably about 2% to 6% of keratin is added to the theoretical weight of rubber in the mass to be treated. The mixture according to the alkali process of treatment is exposed to steam pressure, usually ranging from 100 to 200 pounds for periods of 12 to 24 hours, with the necessary additions of alkali and moisture dependent upon the kind of stock used. In the heater process the mixture is also exposed to steam pressure for varying periods of time, dependent upon the stock employed, with the addition of the necessary oil. In either case the material mixed with the scrap is subjected to a very drastic hydrolyzing action while in the digester, the hydrolyzing action in the one case being carried forward by the action of caustic, heat, pressure, and moisture, and in the other case by heat, pressure, and moisture. The material used is accordingly completely broken down and in either case a proportion of the cleavage products of keratin present is utilized by the rubber scrap after washing, to remove all the soluble material, with the effect of softening or plasticizing it to better advantage than oil, and with the added advantage that when revulcanized the material is firmer in texture with a higher tensile and finer grain than from ordinary reclaimed rubber and will not soften under service when in contact with heated surfaces. It is found also in practice that a reclaimed rubber that has been plasticized with these hydrolytic decomposition products will disperse pigment in a shorter time than ordinary reclaim that has been plasticized by the use of oil. The finished product will not soften under service when exposed to the action of a heated roadway or pavement but will maintain its elasticity and hardness and prevent excessive wear.

When the hydrolyzed keratin is used in place of keratin in its natural state I prefer that there be used the cleavage products obtained by the hydrolytic decomposition of keratin as referred to in my Letters Patent No. 1,683,863 of September 11, 1928.

The present reclaimed rubber which has been acted upon by the cleavage products of keratin by which it is rendered more amenable to processing before revulcanization, will possess after revulcanization some of the advantages possessed by the rubber composition referred to in my aforesaid patent and the full advantages thereof may be obtained if the present reclaimed rubber, with or without fresh rubber added to it, have compounded therewith as a simple mix cleavage products of keratin as referred to in my aforesaid patent.

Having thus fully described my invention, I claim and desire to secure by Letter Patent of the United States:

1. Reclaimed rubber obtained from rubber scrap by a devulcanizing process having a hydrolytic action, in which the rubber scrap from which the reclaimed rubber is obtained has been subjected to the action of cleavage products obtained from keratin during the process of devulcanization of the rubber scrap from which the reclaim is made.

2. Reclaimed rubber obtained from rubber scrap by a devulcanizing process having a hydrolytic action, in which the rubber scrap from which the reclaimed rubber is obtained has mixed with it keratin, and both rubber scrap and keratin with it subjected to the devulcanizing process.

CHARLES H. CAMPBELL.